(12) United States Patent
Weinert et al.

(10) Patent No.: US 10,196,895 B2
(45) Date of Patent: Feb. 5, 2019

(54) COOLED TURBINE RUNNER FOR AN AIRCRAFT ENGINE

(71) Applicant: Rolls-Royce Deutschland Ltd & Co KG, Blankenfelde-Mahlow (DE)

(72) Inventors: Markus Weinert, Rangsdorf (DE); Tobias Leymann, Berlin (DE)

(73) Assignee: Rolls-Royce Deutschland Ltd & Co KG, Blankenfelde-Mahlow (DE)

(*) Notice: Subject to any disclaimer, the term of this patent is extended or adjusted under 35 U.S.C. 154(b) by 365 days.

(21) Appl. No.: 15/215,145

(22) Filed: Jul. 20, 2016

(65) Prior Publication Data

US 2017/0022818 A1 Jan. 26, 2017

(30) Foreign Application Priority Data

Jul. 20, 2015 (DE) .................. 10 2015 111 750

(51) Int. Cl.
*F01D 5/08* (2006.01)
*F01D 5/30* (2006.01)
(Continued)

(52) U.S. Cl.
CPC ............ *F01D 5/087* (2013.01); *F01D 5/081* (2013.01); *F01D 5/082* (2013.01); *F01D 5/12* (2013.01);
(Continued)

(58) Field of Classification Search
CPC ........ F01D 5/087; F01D 5/3015; F01D 5/081; F01D 5/082; Y02T 50/676; Y02T 50/673
See application file for complete search history.

(56) References Cited

U.S. PATENT DOCUMENTS 4,178,129 A 12/1979 Jenkinson
4,582,467 A * 4/1986 Kisling ................. F01D 5/3015
    415/115
(Continued)

FOREIGN PATENT DOCUMENTS

DE     1221497 B  *  7/1966  ............. F01D 5/081
DE    10332561 A1    1/2005
(Continued)

OTHER PUBLICATIONS

German Search Report dated Jul. 20, 2015 for counterpart German Application No. 10 2015 111 750.9.
(Continued)

*Primary Examiner* — Matthew W Jellett
(74) *Attorney, Agent, or Firm* — Shuttleworth & Ingersoll, PLC; Timothy Klima (57) ABSTRACT

A cooled turbine runner for a gas turbine, in particular an aircraft engine, with turbine blades that are radially arranged at the circumferential surface of a rotor disk, wherein respectively a turbine blade is inserted with a profiled blade root into a correspondingly profiled disk finger groove at the circumferential surface of the rotor disk. A cooling device with at least one cooling air supply channel is provided, which extends at least substantially axially and at least over a part of the axial length of the blade root, and which has at least one inlet with an inlet opening at an inflow side of the blade root, wherein the inlet is embodied with a projection. A middle axis of the inlet has, in a direction oriented towards the inlet opening and in the area of the inlet opening, an extension component in the rotational direction of the rotor disk.

18 Claims, 9 Drawing Sheets

(51) Int. Cl.
  *F01D 5/12* (2006.01)
  *F01D 9/02* (2006.01)
  *F01D 11/00* (2006.01)

(52) U.S. Cl.
  CPC ......... *F01D 5/3007* (2013.01); *F01D 5/3015* (2013.01); *F01D 9/02* (2013.01); *F01D 11/001* (2013.01); *F05D 2220/323* (2013.01); *F05D 2250/184* (2013.01); *F05D 2260/20* (2013.01); *Y02T 50/671* (2013.01); *Y02T 50/673* (2013.01); *Y02T 50/676* (2013.01)

(56) References Cited

U.S. PATENT DOCUMENTS

| | | | | |
|---|---|---|---|---|
| 5,173,024 | A | * | 12/1992 | Mouchel ................ F01D 5/066 416/220 R |
| 5,352,087 | A | * | 10/1994 | Antonellis ........... F01D 11/001 415/115 |
| 5,984,636 | A | * | 11/1999 | Fahndrich ............. F01D 5/3015 415/178 |
| 6,290,464 | B1 | | 9/2001 | Negulescu et al. |
| 7,121,797 | B2 | | 10/2006 | Negulescu et al. |
| 2007/0116571 | A1 | | 5/2007 | Djeridane et al. |
| 2007/0217904 | A1 | * | 9/2007 | Dixon .................... F01D 5/081 415/116 |

FOREIGN PATENT DOCUMENTS

| | | |
|---|---|---|
| EP | 1004748 A2 | 5/2000 |
| EP | 1464792 A1 | 10/2004 |

OTHER PUBLICATIONS

European Search Report dated Dec. 12, 2016 for counterpart European Application No. 16176167.1.

* cited by examiner

COOLED TURBINE RUNNER FOR AN AIRCRAFT ENGINE

This application claims priority to German Patent Application DE102015111750.9 filed Jul. 20, 2015, the entirety of which is incorporated by reference herein.

The invention relates to a cooled turbine runner, in particular a medium-pressure or high-pressure turbine runner for an aircraft engine, in which a cooling device is provided according to the features disclosed herein, with the cooling device comprising at least one cooling air supply channel that extends at least substantially axially and at least over a part of the axial length of a blade root of a turbine blade.

In known turbine runners or rotors with cooled high-pressure turbine blades, the cooling air channels of the turbine blades are supplied via channels that are mostly arranged radially inside the turbine blades. Here, secondary air, which is supplied to the high-pressure rotor blades for the purpose of cooling, flows from a cavity in front of the turbine runner through axial channels that may for example be formed between the blade root and a rotor disk and are also referred to as bucket grooves, and from which the cooling channels, extending radially into the rotor blades, branch off. The cooling air that is thus supplied to the cooling air channels of the turbine runner usually has turbulence swirls and in most cases does not impinge on an inlet in the axial cooling air channel at an advantageous angle. This results in pressure losses, by which the possibility of cooling the high-pressure turbine rotor blades, for example by means of film cooling, is strongly limited. This may lead to a restriction of the performance cycle of the aircraft engine, for example.

From DE 103 32 561 A1, EP 1 004 748 B1 and EP 1 464 792 B1 turbine runners with different designs of cooling air supply channels are known. All these solutions have in common that they aim at providing a maximally effective cooling of the turbine blades with a high-pressure cooling air that is supplied to the turbine runner in order to minimize the thermal load of the turbine blades and to ensure a maximally long service life. As can for example be seen in DE 103 32 561 A1, it is preferred here that the area of the turbine blade intake at the disk rim of the rotor disk of a turbine runner is designed in such a manner that a slit-like cooling air supply channel remains between a blade root of a turbine blade and a finger pane groove present between the disk fingers of the rotor disk, which support the turbine blade, with a cooling air flow being guided through the slit-like cooling air supply channel in mostly axial direction of the turbine blade, and with cooling channels branching off radially from the slit-like cooling air supply channel into a blade profile of a turbine blade.

However, in all these known solutions the pressure that is available in the respective blade for an efficient cooling of the turbine blades is considerably reduced, in particular in the event that a cooling air flow enters the cooling air supply channel with a turbulence swirl, due to high pressure losses at the entrance into the cooling air supply channel, whereby the cooling in the turbine blades as well as in the disk rim and thus the service life of the turbine blade as well as of the entire turbine runner in the engine are compromised.

From U.S. Pat. No. 4,178,129 A, a cooling system for turbine runners of gas turbine engines with a pre-swirl nozzle rim is known, which is configured for the purpose of creating a ring-shaped, circumferentially substantially uninterrupted cooling air flow with swirls that is directed towards the front side of the turbine runner that is facing it. The cooling system has a rim of cooling air pick-up elements formed at the front side of the turbine runner and facing towards the pre-swirl nozzle rim as they feed cooling channels that are formed in the turbine rotor blades. Here, the cooling air pick-up elements are embodied as Pitot-tube pick-up elements that jut out individually from the front side of the turbine runner towards the pre-swirl nozzle rim.

Here, the effective cooling of such an embodiment depends on the position and the orientation of the nozzles of the pre-swirl nozzle rim or leading nozzles, wherein the supply pressure of the turbine rotor blade with supplied secondary air may possibly be too low, and for example due to a necessary deflection of the secondary air, high pressure losses may occur as the secondary air is guided to the blade.

It is an object of the invention to form a cooled turbine runner for an aircraft engine, of the kind as it has been described more detailed above, so that an effective cooling of the turbine blades and of the disk rim and thus a long service life of the turbine runner can be ensured independently of the position and orientation of a pre-swirl nozzle.

The object is achieved with a turbine runner that is embodied according to the features as disclosed herein.

What is thus provided is a cooled turbine runner for an aircraft engine, with turbine blades that are arranged radially at a circumferential surface of a rotor disk, wherein respectively a turbine blade is inserted with a profiled blade root into a correspondingly profiled disk finger groove at the circumferential surface of the rotor disk, and wherein a cooling device is provided with at least one cooling air supply channel that extends at least substantially axially and at least over a part of the axial length of the blade root, and that has an inlet with an inlet opening at an inflow side of the blade root, wherein the inlet is embodied with a projection. According to the invention it is suggested that a middle axis of the inlet, in a direction oriented towards the inlet opening and in the area of the inlet opening, has an extension component in the rotational direction of the rotor disk.

The embodiment of the turbine runner according to the invention has the advantage that, thanks to the proposed embodiment of the projection at the entry-side of the cooling air supply channel, an efficient turbine blade cooling can be achieved even with a cooling air flow that has a circumferential component which is smaller than that of the rotor. This is achieved by the fact that the inlet opening is facing towards a cooling air flow due to the orientation of the inlet according to the invention, and thus even a cooling air flow that is characterized by a relative turbulence swirl and is entering through the inlet opening against the rotational direction of the rotor disk is sufficient for a satisfactory cooling the turbine blades or the rotational disk respectively, in spite of pressure losses due to twist swirls.

By reducing the pressure losses, an efficient internal cooling of the respective turbine blade is thus facilitated in a simple manner, wherein cooling air can also be blown out in areas with high counter pressure, which are only extremely hard to cool by means of conventional cooling systems. Hence, the service life of the turbine blades and of the rotational disk of the turbine runner can be considerably prolonged, wherein the efficiency of the blade cooling is improved as well.

What is understood by a projection here is any kind of protrusion or attachment in the broadest sense, wherein the projection can be embodied at a separate structural component and can also be integral with the turbine blade. Then, the projection in particular has a larger extension against a flow direction of working fluid or secondary air inside an annular channel as compared to the disk fingers of the rotor disk in a radial area in which the projection is arranged.

Here, it can be provided that a turbine blade has one or multiple projections in the area of its blade root, which are in particular arranged at a distance from each other in the radial direction.

In an advantageous embodiment of the turbine runner according to the invention, it is provided that the projection is embodied at a disk device that is located upstream from the blade root in the flow direction, and that is in particular held in abutment at the blade root. With such an embodiment, the projections forming the inlets can be configured and flexibly designed in a constructionally simple manner. Then, the disk device can be connected to the turbine blade or to multiple turbine blades and/or to the rotor disk in various ways in a detachable or non-detachable manner.

The disk device can be embodied as a covering plate that forms a full ring and can also be embodied with multiple segments in the circumferential direction, wherein in particular in the latter embodiment at least one turbine blade is assigned to each segment. It can also be provided that a segment is assigned to multiple turbine blades, wherein in the mounted state the segments preferably form an in particular completely circumferential disk ring.

In a preferred embodiment of the invention, it is provided that the disk device has multiple inlets that are assigned to one turbine. In this manner, a particularly advantageous cooling air supply of the turbine blade can be achieved, just like by embodying the projections integrally with the turbine blade.

What is particularly important is the constructional design of the outflow side of the projections, so that the creation of turbulences can be prevented as far as possible.

In principle, any solution that is indicated in connection with the invention that has a disk device forming a projection with a cooling air inlet is advantageous, independently of the orientation of the inlet's middle axis.

A desired cooling of the turbine blade can be achieved in a simple manner if at least one cooling channel branches off from the substantially axial cooling air supply channel and extends in the interior of the turbine blade to an outlet opening at its surface, wherein in particular at least one cooling channel is connected to an inlet. Preferably, the turbine blade has three such cooling channels, wherein also less or more cooling channels can be provided depending on the application case.

Here, in particular three, i.e. all, cooling channels can be connected to an inlet. As an alternative to this, a first and a second cooling channel can be connected to one inlet, and a third cooling channel can be connected to a separate inlet. However, in principle the number of cooling channels that are combined with an inlet can vary depending on the application case.

Alternatively or additionally to an embodiment of a segment of the disk device with multiple inlets for a turbine blade, it can also be provided that a segment of the disk device comprises multiple inlets of adjacent turbine blades. In this way, the segments can have a larger extension in the circumferential direction, whereby mounting can be facilitated and a sealing effect can be improved, for example.

In an advantageous embodiment of a turbine runner according to the invention, it is provided that the disk device is embodied as an integral part of the sealing device, which is arranged in the assembled state between turbine guide vanes and turbine runners, or between stator and rotor devices, which are adjacent to each other in the axial direction. Such a sealing device can be a so-called labyrinth seal, a sealing strip at the disk rim, or an intermediate stage sealing element, for example.

Facing sides of the disk device and of the turbine blade are preferably embodied in a planar manner, respectively, so that they can be brought into a pressure-loss-avoiding operative connection with each other in a simple manner.

In particular when it comes to cooling air which flows in with a turbulence swirl, it can be advantageous if the inlet comprises a bend in the area of the projection, as viewed horizontally in the flow direction, wherein a middle axis in the area of the inlet of a cooling air flow that has a turbulence swirl is at least approximately aligned with the cooling air inflow direction, and is substantially oriented in the axial extension of the cooling air supply channel behind the bend. Through the bend, the entrance of the cooling air flow can be designed to be flat with respect to the inflow side of the turbine blade and the rotor disk, so that the cooling air flow enters the inlet with a particularly low pressure loss, even if a turbulence swirl is present. At that, in the relative system, the cooling air inflow direction can be substantially opposite to the rotational direction of the rotational disk in the circumferential direction of the rotor disk.

In an advantageous embodiment of the turbine wheel according to the invention, it is provided that the inlet is configured in an NACA-shaped manner in the area of the projection, wherein the inlet is delimited in the circumferential direction of the turbine wheel in particular by two lateral surfaces, with their distance increasing in the radial direction against the rotational direction of the rotor disk. Here, a flow that is supplied to the cooling air passage is advantageously only disturbed to a small degree. The air inlet can in particular be formed by an area between the lateral surfaces that is embodied in a ramp-shaped manner.

Apart from the embodiment of the inlet as a so-called flat NACA intake or "submerged inlet", in which one flank in particular forms a straight line and the other flank is bent in cross-section, the inlet can alternatively also be embodied in the kind of an inlet scoop, or figuratively speaking in the kind of a baseball glove, just like in the previously shown embodiment possibilities. Entry losses are minimized with every one of these inlet shapes.

If the inlet comprises a cross-sectional channel area in the area of the projection that extends in flow direction in a diffusor-like manner, a micro-compressor is in particular formed in this way, by means of which an efficient turbine blade cooling with an increase in static pressure is advantageously achieved. Even a cooling air flow that enters the cooling air channel against the rotational direction of the rotor disk with a relative turbulence swirl is sufficient for a satisfactory cooling of the turbine blades, despite pressure losses that are caused by twist swirls. Thanks to the additional gain in cooling flow stagnation pressure that can be thus achieved in the area of the inlet, the internal cooling of the respective turbine blade can be further improved, wherein cooling air can also be blown out in areas with high counter-pressure in this way. In this manner, the service life of the turbine blades and of the rotational disk of the turbine runner can be prolonged.

The geometric design of the micro compressor is expediently realized in such a manner that the aerodynamic entry area is optimized in the design point with respect to the relative velocity of the incoming flow, so that a mostly loss-free inflow into the micro-compressor may take place. The reduction of the flow velocity that occurs in the micro-compressor causes a steady increase in static pressure, which ultimately leads to an improved cooling system.

In an embodiment of the invention that is characterized by low flow losses in the circumferential direction, it can be provided that the disk device, on the side that is facing away from the blade root, has a profile between two inlets that are arranged at a distance from each other in the circumferential direction, with the profile connecting the adjacent edges of the inlets in particular in a wave-like manner. Such a wave-like profile can also be used with the blade.

By means of an appropriate design of the profile, an advantageous air supply to the inlets can be achieved, wherein turbulences are reduced and advantageously avoided in the area of the edges or between the adjacent inlets. Downstream of the edge, the profile can preferably be embodied in a leveled manner with respect to the area that comprises the edge, or an area between the edges of adjacent inlets can be filled by the profile in such a manner that only minor turbulences or no turbulences at all occur in this area. In this manner, pressure loss that may lead to a reduced cooling performance is avoided. At that, the profile can be embodied in accordance with the respective application case regarding its shape, orientation and position.

In connection with—as well as independently of—the wave-like profile design, the profile of the blown surface can have bent grooves and/or webs extending substantially in the circumferential direction of the turbine device in the area of the inlets, between them as well as below or above them, in order to improve flow conduction between the inlets to the desired degree.

If the disk device has at least one ledge which protrudes in the radial direction and by means of which at least one turbine blade is secured at the rotor disk in the axial direction, the disk device—apart from axially securing the turbine blade at the rotor disk —can also be simply held in its radial position.

Here, it can be provided that a ledge is provided in an inner area of the disk device with respect to the radial direction, by means of which the disk device can be mounted at the rotor disk. Alternatively or additionally, a ledge can be provided in an outer area of the disk device with respect to the radial direction, by means of which the disk device can be brought into mesh with at least one turbine blade.

Apart from the mentioned combinations of features, the features that are specified in the patent claims as well as the features that are specified in the following exemplary embodiment are also respectively suitable on their own or in any combination with each other to further develop the subject matter according to the invention.

Other advantages and embodiment options for a cooled turbine runner according to the invention also follow from the patent claims and the exemplary embodiments that are described in principle in the following by referring to the drawing, wherein, with a view to clarity, the same reference signs are respectively used for structurally and functionally identical components.

Herein.

Figure 1:
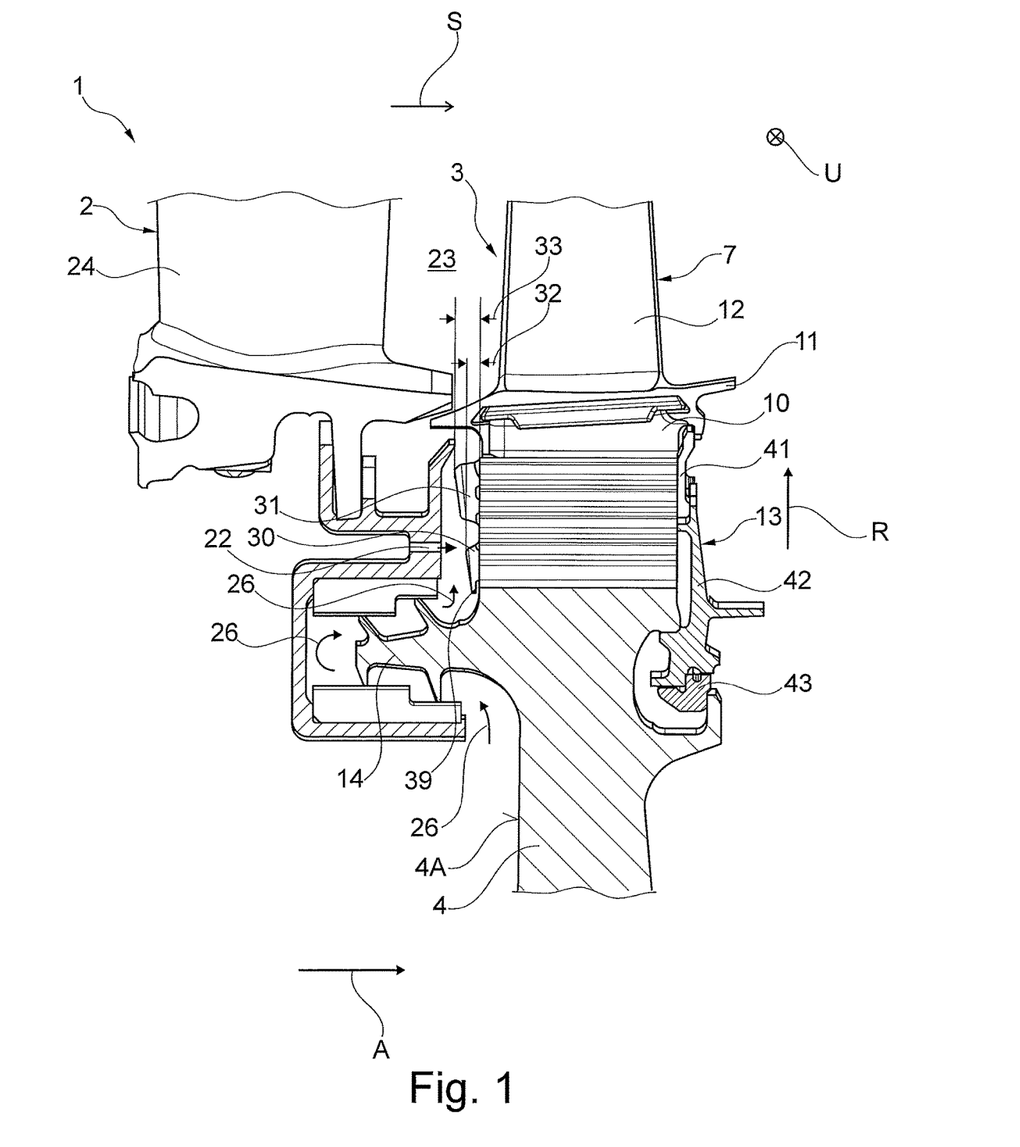
FIG. 1 shows a simplified view of a section of a high-pressure turbine of an aircraft engine, wherein a turbine guide wheel and a cooled turbine runner comprising a rotor disk and turbine blades that are arranged at the circumferential side of the same can be seen in more detail.
Figure 2:
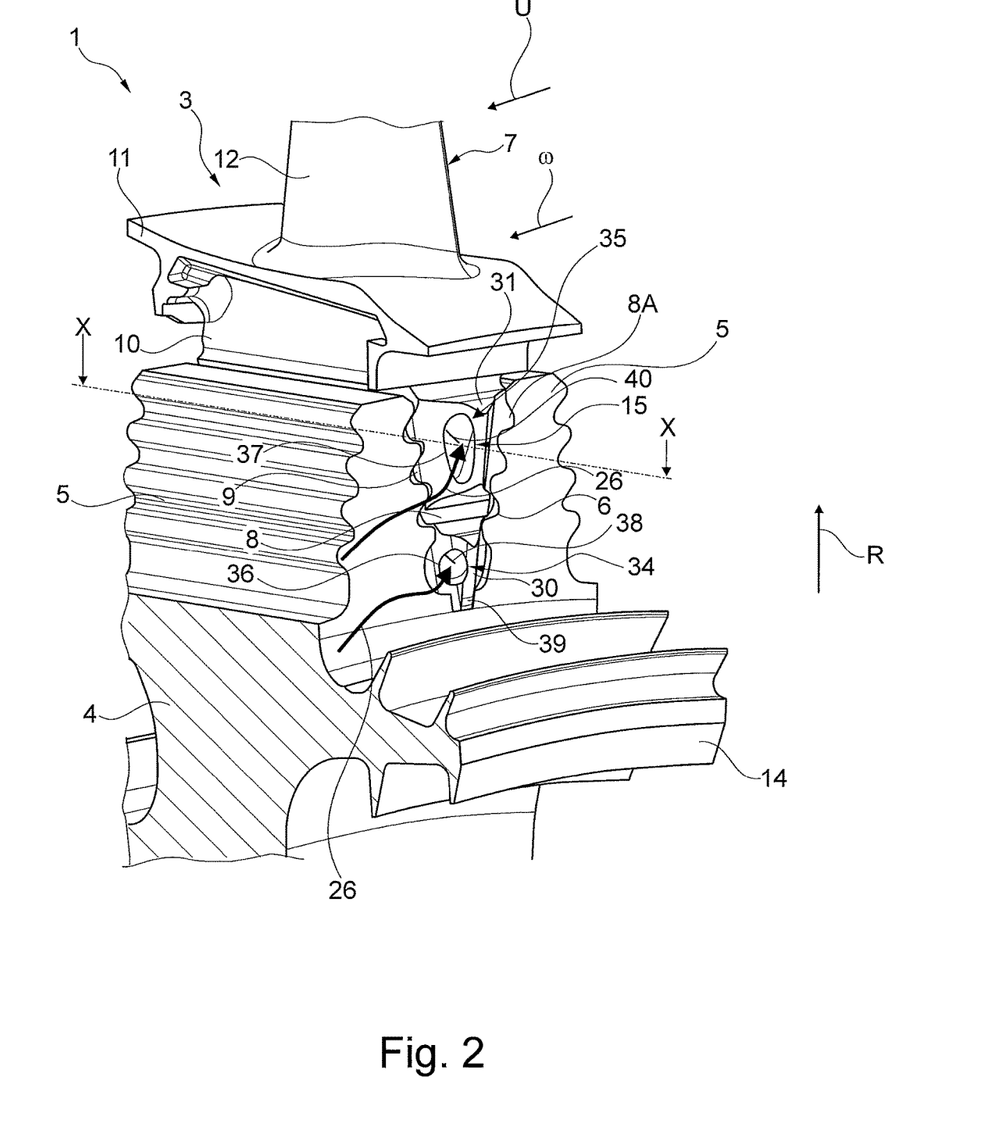
FIG. 2 shows a perspective view of a disk rim area of the turbine runner of FIG. 1, wherein a turbine blade that is provided with a cooling device and is supported between disk fingers of the rotor disk can be seen partially, and wherein inlets for cooling air with projections are shown in more detail in the area of an inflow side of a blade root of a turbine blade.
Figure 3:
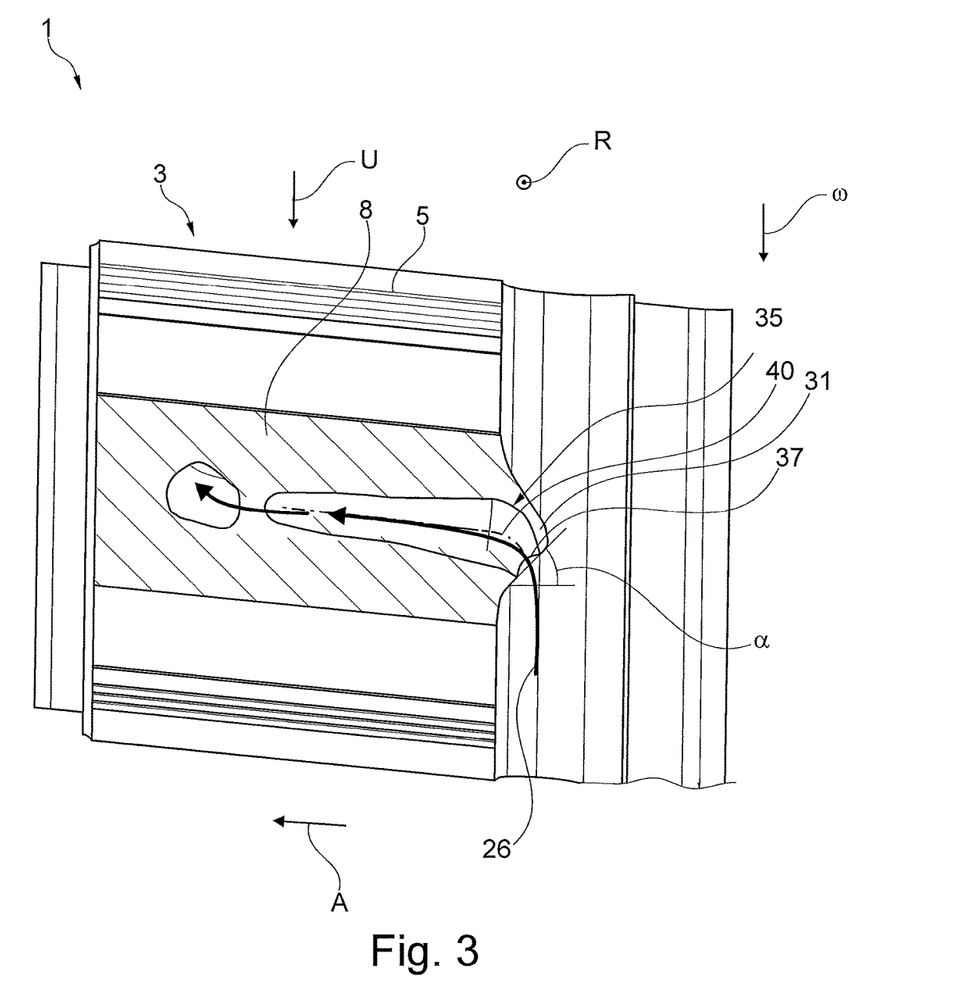
FIG. 3 shows a schematized sectional view along the line X-X in FIG. 2, wherein a cooling air supply channel that extends inside the blade root substantially in the axial direction and that connects to the inlet can be seen.

Referring to FIG. 1 to FIG. 3, different sections and views of a high-pressure or medium-pressure turbine device 1 of an aircraft engine with a turbine guide wheel 2 and a turbine runner 3 can be seen in a first embodiment form. The turbine runner 3 has a rotor disk 4, with profiled disk fingers 5 being formed at its circumferential surface, which is formed by a disk rim.

In the space that remains between the disk fingers 5 and that forms a disk finger groove 6 respectively a turbine blade 7 is supported with a blade root 8 that has a fir-tree shaped profile 9 corresponding to the profiled disk fingers 5. Connecting radially outward to the blade root 8 of the turbine blade 7 are a blade neck 10, a blade platform 11, a blade profile 12 comprising a pressure and a suction side, and finally a blade cover band that is not shown in any more detail. In the present case, the turbine blades 7 are secured against an axial displacement by a suitably designed securing device 13 that is supported at the turbine blades 7 as well as at the rotor disk 4. In the present case, the securing device 13 is embodied in a multi-part manner with securing segments 41, a sealing element 42 and a snap ring 43, as viewed from the outside to the inside in the radial direction R of the turbine device 1.

Figure 8:
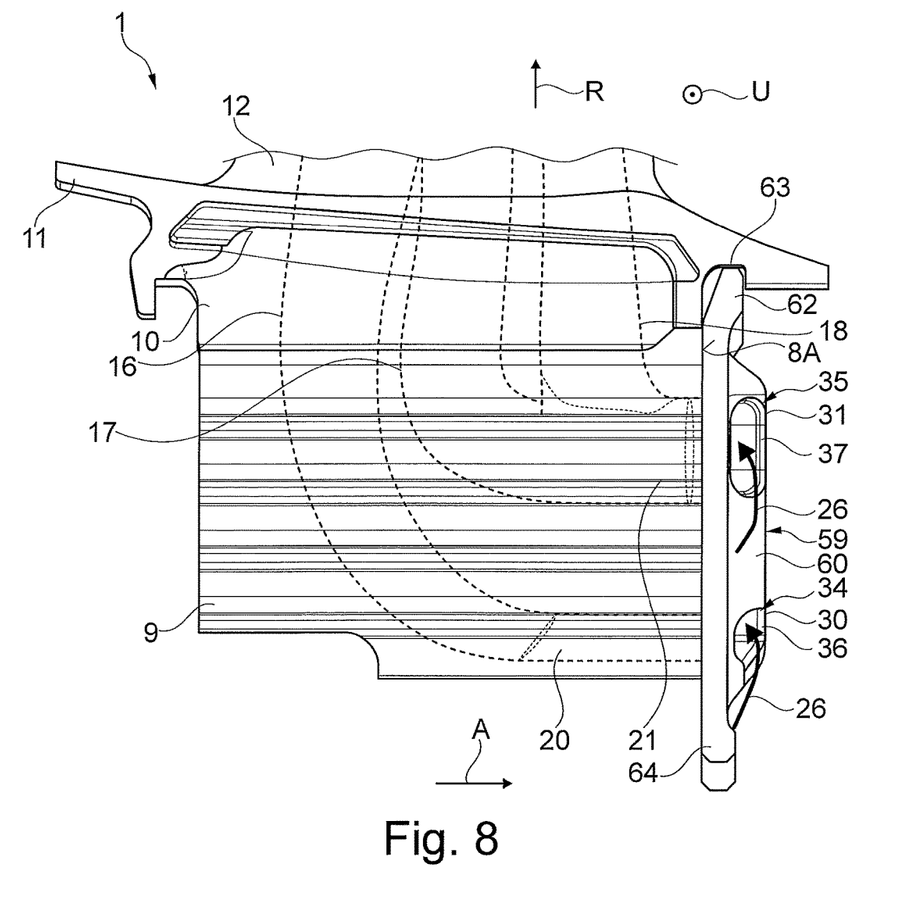
FIG. 8 shows a simplified lateral view of a section of a turbine blade and a segment of the disk device according to FIG. 6 and FIG. 7, wherein the segment is supported via a ledge inside a groove of the turbine blade for the purpose of the axial securing of the turbine blade.

In analogy to the view according to FIG. 8, multiple—in the present case three—cooling channels 16, 17, 18 of a cooling device 15 according to FIG. 2, which are located in the interior of the turbine blades 7 and into which cooling air is admitted, extend from the blade root 6 outward in the radial direction and, if required, in addition in the transverse direction up to the outlet openings, which may for example take the form of film cooling bores at the surface of areas of the turbine blade 7 that are subject to heat load.

In the present case, cooling air is fed into the cooling channels 16, 17, 18, as can in particular be seen from FIG. 8, via two cooling air supply channels 20, 21 of the cooling device 15, which substantially extend in the axial direction A of the blade root 8 over a part of the axial length of the blade root 8, and which are arranged in the blade root 8 at a distance from each other in the radial direction R of the turbine device 1. In the present case, a radially inner or internally located cooling air supply channel 20 is connected to a downstream-side cooling channel 16, while the radially outer cooling air supply channel 21 is connected to the cooling channels 17 and 18 that are facing towards the inflow side 8A of the blade root, in the area of which the highest counter-pressure is present.

In the shown embodiment, the turbine runner 1 is a so-called stage-II rotor disk of a second stage of a axial-flow high-pressure turbine of an aircraft engine, which is arranged in an annular channel 23 behind the guide vanes 24 of the turbine guide wheel 2, as seen in the flow direction. The design of the cooling device 15 that is shown in the turbine runner 1 can principally be used independently of a particular stage position.

In the present exemplary embodiment, cooling air from a pre-swirl nozzle 22 of the turbine guide wheel 2 as well as a cooling air flow or secondary air flow that is indicated by arrows 26 and that first passes a sealing device 14 at the disk rim of the rotor disk 4 that is embodied as a labyrinth seal, also referred to as sealing strip or intermediate stage sealing element, is conveyed to the front surface or inflow side 8A of the blade root 8 of the turbine blades 7 that is facing towards the guide vanes 24.

Here, the cooling flow 26 impinges on projections 30, 31 that are embodied integrally with the blade root 8 and that project, in the axial direction A of the turbine device 1 against a flow direction S of working fluid inside the annular channel 23, beyond the rotor disk 4 by an axial extension 32 or 33 in this area. The projections 30, 31 respectively have one inlet 34 or 35 with an inlet opening 36 or 37, via which the respective cooling air supply channel 20 or 21 can be supplied with cooling air from the secondary flow and from which the cooling air is guided to the film cooling bores or outlet openings via the cooling channels 16, 17, 18 that are branching off radially outward.

In the shown embodiment, the projections 30, 31 have a shape—in top view—in the radial direction R of the turbine device 1 that follows the blade root geometry, and that is optimized in regards of tension due to the fir-tree shaped profile substantially triangular here, wherein the projections 30, 31 have a substantially tangential extension with respect to the rotor disk 4 in the circumferential direction U of the turbine device 1, so that lossy turbulences occurring in this area are as minor as possible.

As can be seen from the respective direction of the arrows 26 of the cooling air flow, the cooling air flow has a negative turbulence swirl towards the cooling air supply channels 20, 21 with respect to the rotational direction of the turbine runner 3 as indicated by the arrow w. Before entering the turbine blades 4, the negative swirl flow has a swirl number of for example approximately 0.5 in the absolute system, which in conventional embodiments would cause considerable cooling air pressure losses in the area of inlets in cooling air supply channels and thus in the entire rotor blade cooling system due to the flow direction being opposed to the rotational direction ω of the rotor disk 4 as well as the swirl-flow-induced crossflow.

In order to reduce or to avoid such losses, a middle axis 38 or 40 of the inlets 34 and 35 in the area of the inlet openings 36 and 37 has respectively an extension component in the rotational direction ω of the rotor disk 4, and is tilted on the whole respectively by an angle a with respect to the axial direction A of the turbine device 1, so that the middle axis 38 or 40 is at least approximately aligned with the relative cooling air inflow direction in the area where the cooling air flow 26 with a turbulence swirl enters the respective inlet 34, 35, wherein cooling air inflow direction extends in the circumferential direction of the rotor disk 4 opposite to its rotational direction ω. In addition, losses can be reduced through an advantageous placement of the static pre-swirl nozzle 22.

In the area of the projections 30, 31, the inlets 34, 35 are configured so as to be horizontally bent in such a manner that behind the bend the middle axes 38, 40 are substantially aligned with the axial orientation of the blade root 8.

In the present case, the inlet openings 36, 37 have a substantially elliptical or oval shape, but in principle can be designed in any manner, in particular so as to be rounded.

Principally, the inflow-side edges of the inlet openings 36 can be configured in an advantageous manner in terms of fluidics with a chamfer or a radius.

Likewise, the length of the axial extensions 32, 33 of the projections 30, 31 can be chosen depending on the application case, wherein loss in the form of turbulences can principally be minimized through a small axial extension or length 32, 33 of the projections 30, 31, while and on the other hand an optimized embodiment with respect to the deflection of the cooling air flow 26 can be achieved through a large axial extension 32, 33. Further, the angle a can also be varied depending on the application case.

In the embodiment according to FIG. 1 to FIG. 3, the projection 30 has a ledge 39 that extends inward in the radial direction R of the turbine device 1, preventing movement of the turbine blade 7 in the axial direction A of the turbine device 1. In this manner, elaborate millings in the area of the rotor disk 4 can be advantageously foregone when it comes to ensuring the axial securing of the turbine blade 7 against the rotor disk 4.

Due to a channel geometry that respectively expands in the flow direction like a diffuser, the inlets 34, 35 can form a kind of micro-compressor in the area of the projections 30, 31. As can in particular be seen in FIG. 3, the projections 30 and 31 deflect the cooling air flow 26 conducted therein, with the cooling air flow decelerating and the pressure increasing accordingly. When the cooling air flow 26 is streaming in radially outward in the circumferential direction U, after flowing through the pre-swirl nozzle 22 and the sealing device 14 at the disk rim, it can have a relative velocity of for example 200 m/s in the rotational direction ω, and is subjected to a pressure increase in the suitably aerodynamically designed projections with their expanding canal cross-sections, which results in a significant gain in cooling flow stagnation pressure during exit from the projection or transition into the axially straight channel area of the cooling air supply channel 20, 21. This additionally gained pressure can be used for cooling the turbine blade more efficiently than with conventional systems.

Figure 4:
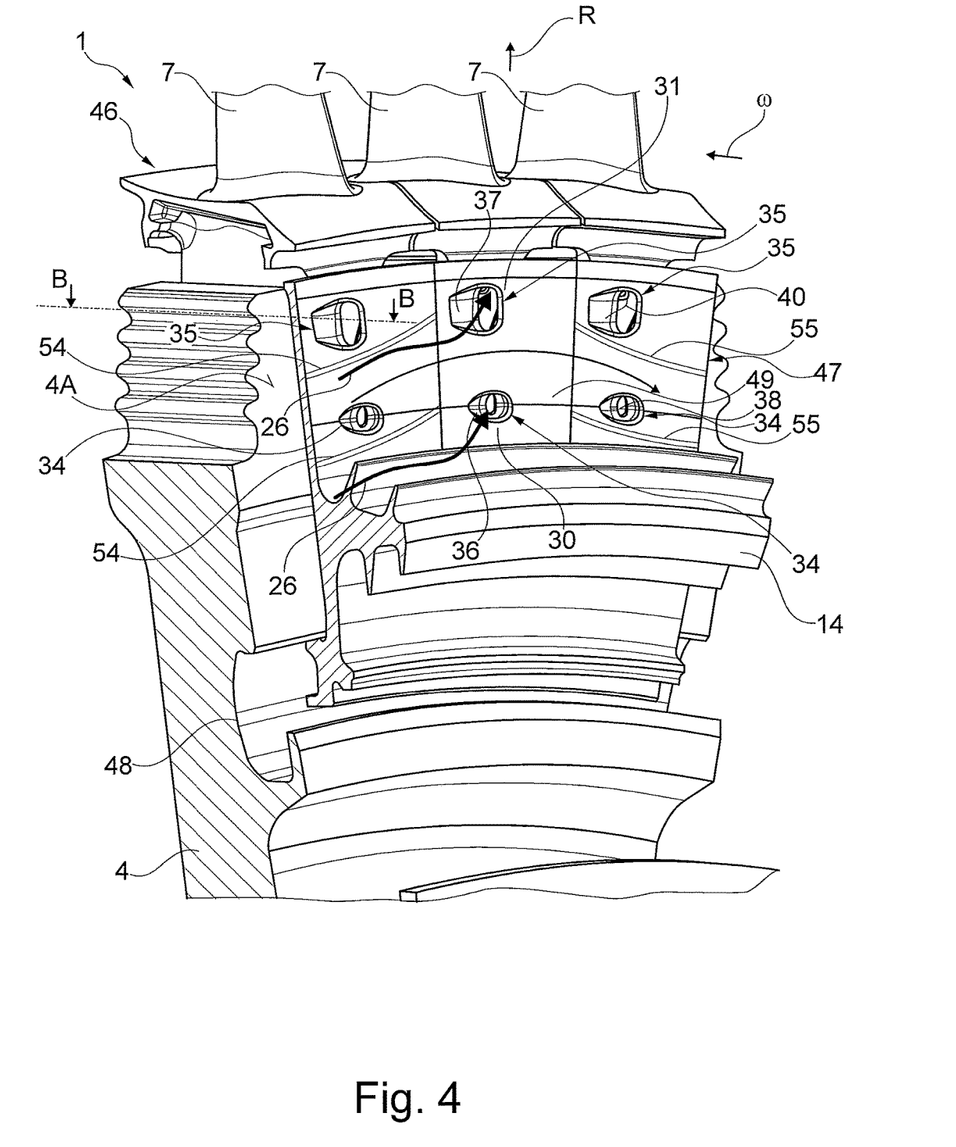
FIG. 4 shows a simplified perspective view of an alternatively embodied turbine runner, wherein projections are formed at a disk device that is embodied as a full ring and supported at the rotor disk.
Figure 5:
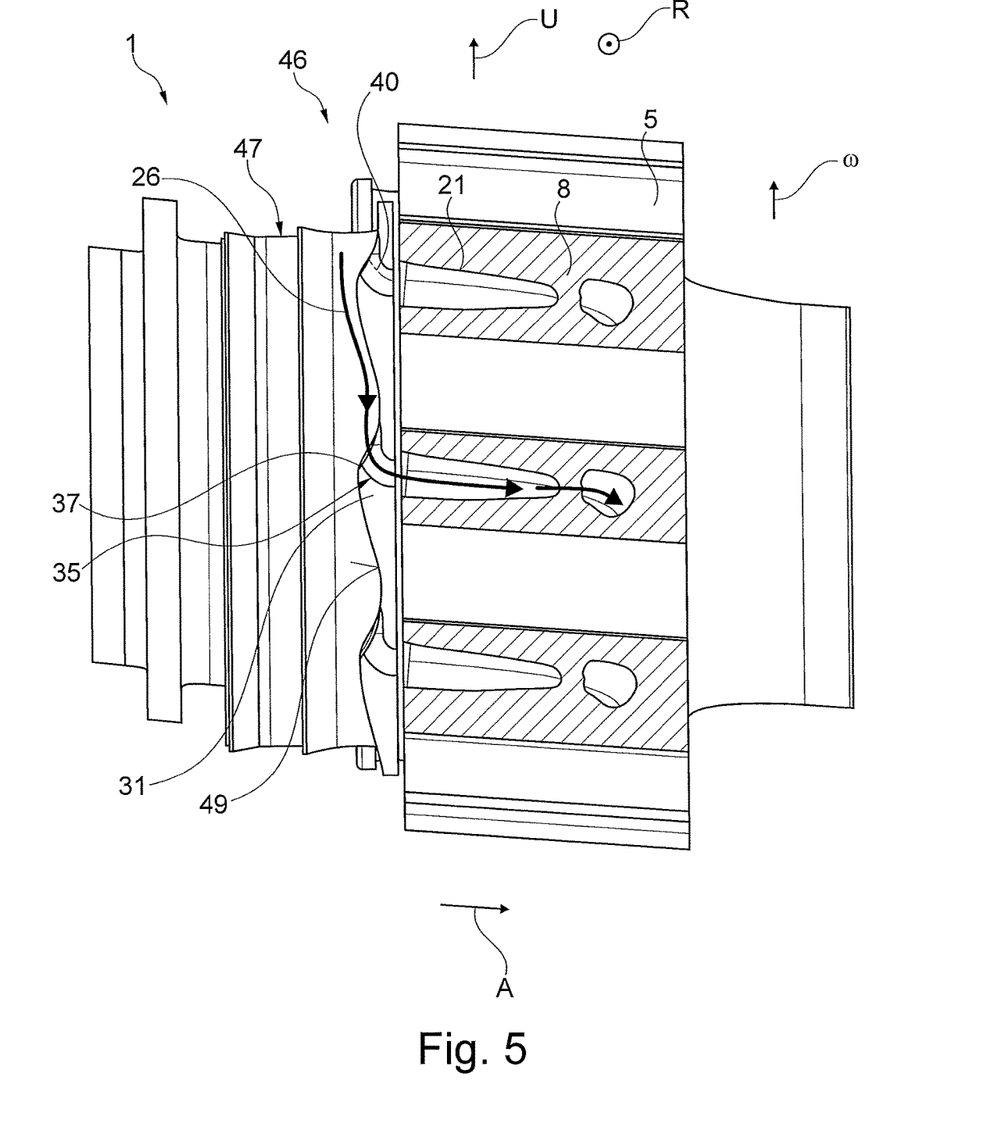
FIG. 5 shows a simplified sectional view along the line B-B in FIG. 4 through the blade roots of three turbine blades that are arranged adjacent to each other in the circumferential direction.

FIG. 4 and FIG. 5 show an alternative embodiment of a turbine runner 46, wherein only the differences to the turbine runner 3 according to FIG. 1 to FIG. 3 will be discussed below.

The turbine runner 46 is embodied with a disk device 47 or covering plate, which comprises the inlets 34, 35 with the projections 30, 31 and is embodied as a ring that runs completely along the circumferential direction U of the turbine device, 1 and thus as a full ring or "rim coverplate" that leans radially against the rotor disk 4. Apart from the projections 30, 31 of all turbine blades 7, the disk device 47 also comprises the intermediate stage sealing element 14 and is supported in the area of a groove 48 of the rotor disk 4 at the same. Here, the inflow side or front side 8A of the blade roots 8 is substantially located in the same plane as an inflow side 4A of the rotor disk 4 in that area. In addition, the disk device 47 and the turbine blades 7 are respectively embodied with planar contact surfaces at their facing sides, as can be seen in more detail in FIG. 5.

Here, a profile 49 of the disk device 47 on a side that is facing away from the turbine blades 7 is chosen in such a manner that flow losses occurring in this area in the circumferential direction U of the turbine device 1 are as low as possible, and the cooling air is supplied to the inlets 34 and 35 to the desired degree. For this purpose, the profile 49 is embodied between adjacent inlets 34 or 35 in a wave-like design in the circumferential direction U of the turbine device 1. In order to be able to influence flow conduction between the inlets 34 or 35 to the desired degree, grooves 54 or webs 55 can be provided in this area, as it is shown in an exemplary manner in FIG. 4. The shape, orientation and length of the grooves 54 and webs 55 can be varied according to requirements.

In this embodiment, turbulences are reduced due to the advantageously large inflow area, wherein there is a great deal of design freedom, in particular with respect to the arrangement of the inlets 34, 35. In addition, an advantageous sealing between the turbine blades 7 and the rotor disk 4 is achieved by means of the disk device 47, so that cooling air consumption by leakages is reduced, and thus the turbine's degree of efficiency is increased. In addition, the turbine blades 7 can be advantageously embodied with a lower weight as compared to the embodiment variant according to FIG. 1 to FIG. 3, whereby a load impact in the area of the blade roots 8 is reduced, with advantageous results for weight-optimized design and/or service life.

Figure 6:
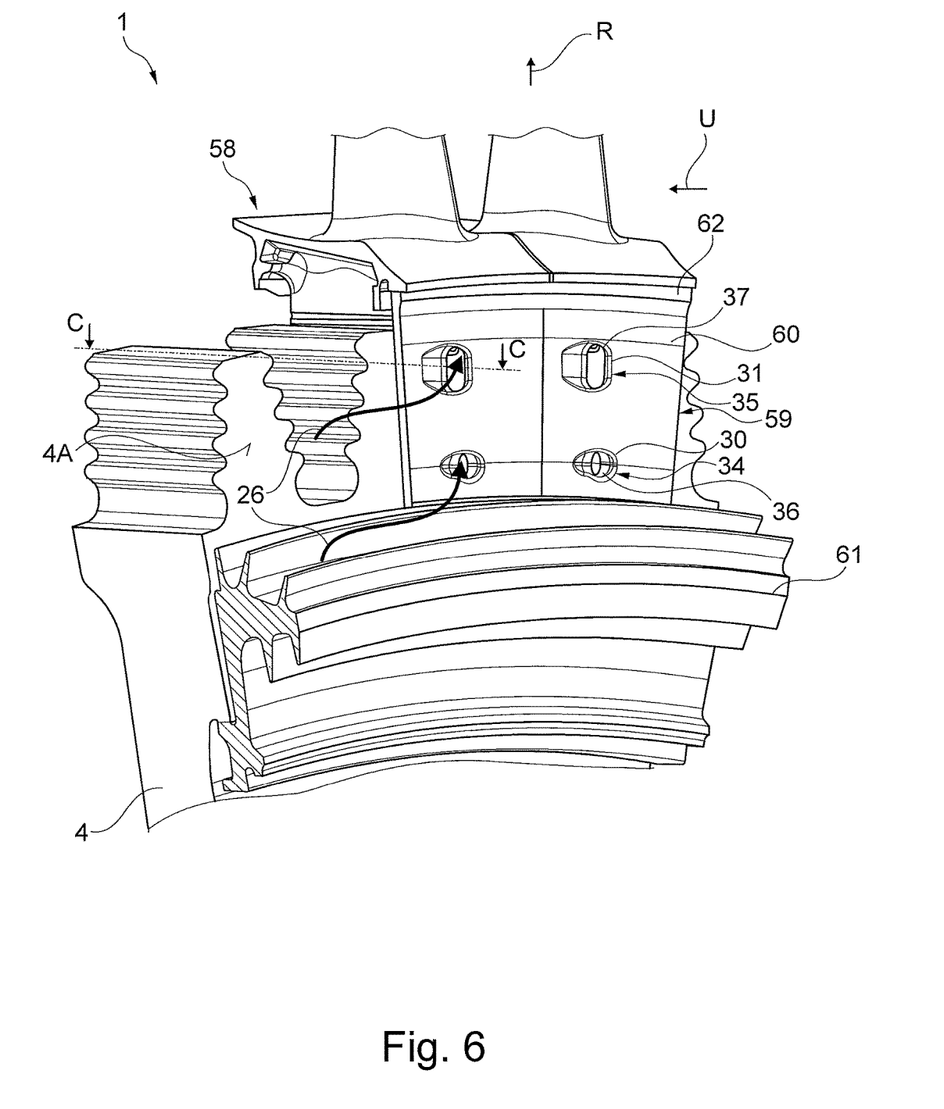
FIG. 6 shows a view of an alternatively embodied turbine runner corresponding to FIG. 4, wherein a disk device that is embodied with multiple segments is shown.
Figure 7:
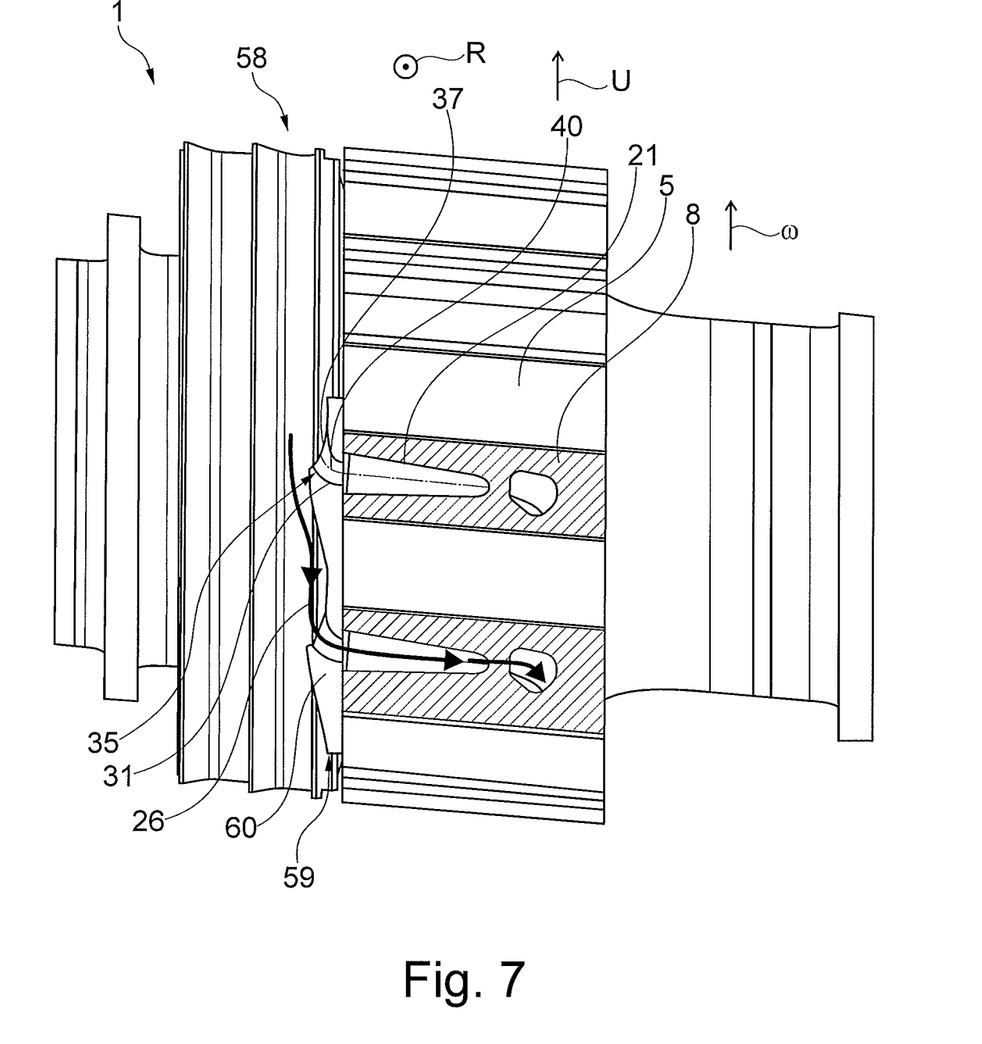
FIG. 7 shows a simplified sectional view along line C-C in FIG. 6 through the blade roots of two turbine blades that are adjacent to each other in the circumferential direction.

Another embodiment form of a turbine runner 58 is shown in FIG. 6 to FIG. 8, wherein only the differences of the turbine runner 58 with respect to the turbine runner 46 will be described below.

The turbine runner 58 also has a disk device 59, which, however, is embodied so as to be segmented in a multi-piece manner in the circumferential direction U of the turbine device 1. FIG. 6 shows a segment 60 of the disk device 59, to which in particular structurally identically embodied segments 60, which are not shown in any more detail in FIG. 6, connect in both directions in the circumferential direction U of the turbine device 1 in the mounted state. Here, all segments 60 form a completely circumferential segmented disk ring in the mounted state.

According to the view shown in FIG. 6, the segment 60 has an extension that corresponds to the extension of two turbine blades 7 in the circumferential direction U of the turbine device 1, wherein in an alternative embodiment of the invention the segment can also have only the extension of one turbine blade, multiple turbine blades or of intermediate values of these. A support for and design of the individual segments 60 is chosen based on the given geometry of the turbine blades 7 and the rotor disk 4, on the load that is present, as well as on leakage requirements.

As for the embodiment of the segments 60 on a side that is facing away from the rotor blades 7 and a side that is facing towards the rotor blades 7, the embodiment of the disk device 47 is referred to. However, in contrast to disk device 47, in the embodiment according to FIG. 6 to FIG. 8 a separate structural component 61 is provided as a "rim cover plate", which can comprise a rotor part of the sealing device 14. The segment 60 acts together with the structural component 61 via a ledge 64 that is turned inwards with respect to the radial direction R of the turbine device 1.

In addition, the segment 60 according to FIG. 8 has a ledge 62, which extends outward with respect to the radial direction R of the turbine device 1 and via which the segment 60 is mounted inside a groove 63 of the turbine blades 7. Here, the segments are secured against any rotation relative to the turbine blades or the rotor disk 4 in an expedient manner by means of a form fit between the disk and the blade through projections and recesses.

Figure 9:
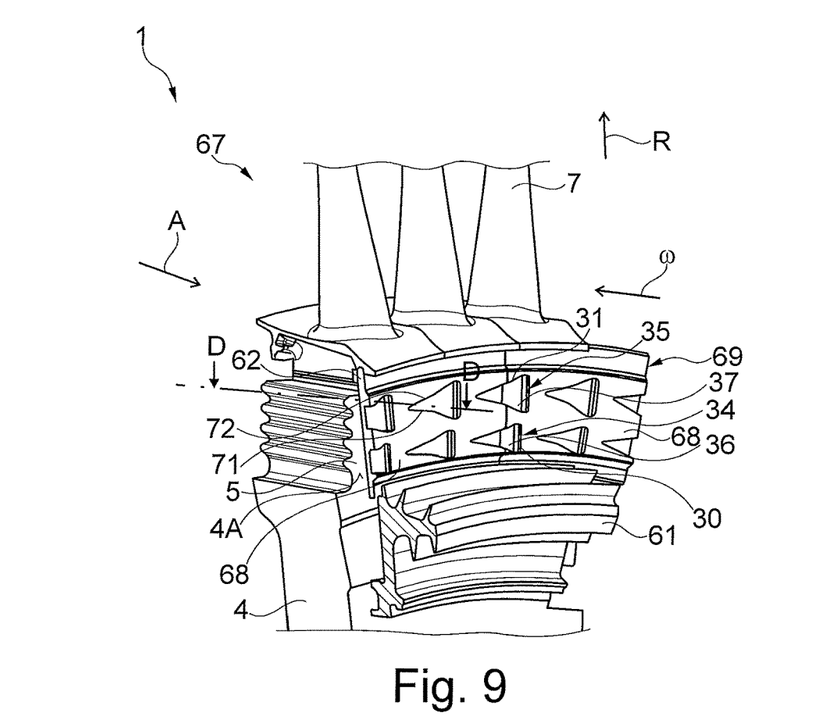
FIG. 9 shows a simplified perspective view of a section of another alternatively embodied turbine runner, wherein a disk device with multiple segments is provided.
Figure 10:
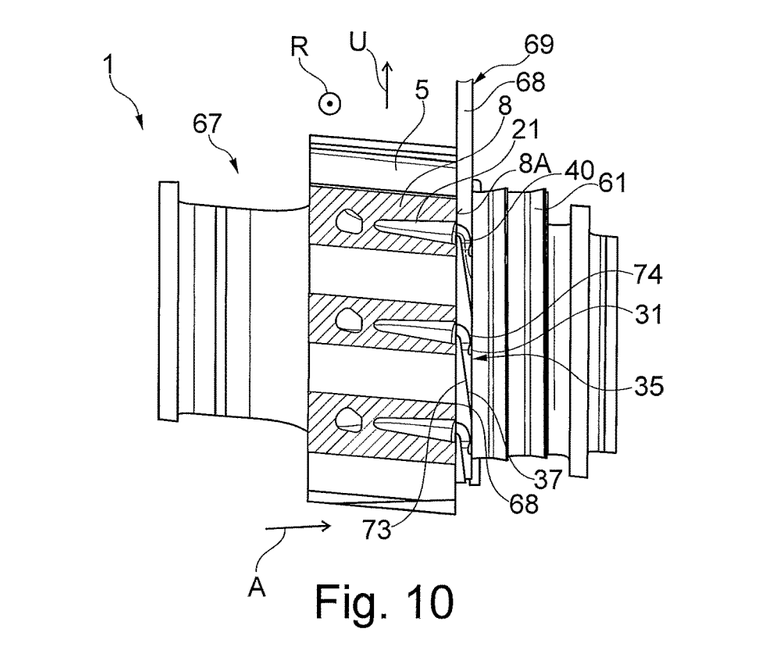
FIG. 10 shows a simplified sectional view along line D-D in FIG. 9 through the blade roots of two turbine blades that are adjacent to each other in the circumferential direction.

Another embodiment of a turbine runner 67 is shown in FIG. 9 and FIG. 10, wherein in the following description substantially the differences to the turbine runner 58 are pointed out.

In FIG. 9 and FIG. 10, a disk device 69 that is embodied with segments 68 can once more be seen, wherein in the present case the segments 68 extend in the circumferential direction U of the turbine device 1 across two turbine blades 7. In this embodiment, both a side that is facing towards the blade roots 8 and an impinged side of the segment 68 that is facing away from the blade roots 8 are embodied in a planar manner, wherein the projections 30, 31 with the inlets 34, 35 are formed by the segments 68. As can further be seen in FIG. 9 and FIG. 10, some inlets 34, 35 are formed at one segment 68 and other inlets 34, 35 are formed at two segments 68 that are adjacent in the circumferential direction U of the turbine device 1.

Here, the inlets 34, 35 are respectively embodied in the kind of a NACA intake, a so-called NACA inlet duct or "submerged inlet", that is characterized by very low flow losses in the circumferential direction U of the turbine device 1. In addition, in such an embodiment the cooling air 26 is supplied to the inlets 34, 35 in an optimized manner, or is sucked in through them. In the present case, the inlets 34, 35 have a substantially triangular shape in the lateral view, wherein their flanks 71, 72 can be embodied so as to be straight with an angle to each other and/or so as to be bent.

As can be seen in FIG. 10, a flank 73 of the inlets 34, 35 that points into the rotational direction $\omega$ is embodied in a substantially straight manner, thus forming a ramp-shaped area. In contrast, another flank 74 opposite the rotational direction $\omega$ is shortened and embodied with a radius. In addition, it can be seen in FIG. 10 that a cross-section of the inlet 34, 35 in an area of the segment 68 that adjoins the blade root 8 is smaller than a cross-section of the cooling air supply channel 21 in an area that adjoins the segment 68, so that a jump in the cross-sectional expansion is present here. Such a jump in the cross-sectional expansion can be used in an analogous manner also with all turbine runners 3, 46 and 58 described above in order to compensate tolerance-related deviations of the disk device 47, rotor disk 4 and turbine blade 7.

Also in this embodiment, e.g. grooves and/or webs can be provided in the area of the side of the segment 68 that is facing away from the front sides of the blade roots 8 in order to design the flow conduct to the desired degree.

Apart from the arrangement of the inlets 34, 35 in segments 68 it can also be provided in an alternative embodiment of the invention that the disk device is configured as a full ring.

PARTS LIST 1 turbine device
2 turbine guide wheel
3 turbine runner
4 rotor disk
4A inflow side of the rotor disk
5 disk finger
6 disk finger groove 7 turbine blade
8 blade root
8A inflow side of the blade root
9 fir-tree shaped profile
10 blade neck
11 blade platform
12 blade profile
13 securing device
14 sealing device
15 cooling device
16, 17, 18 cooling channel
20, 21 cooling air supply channel
22 pre-swirl nozzle
23 annular channel
24 guide vane
26 cooling air flow
30, 31 projection
32, 33 axial extension of the projection
34, 35 inlet
36, 37 inlet opening
38 middle axis
39 ledge
40 middle axis
41 securing segment
42 sealing element
43 snap ring
46 turbine runner
47 disk device
48 groove of rotor disk
49 profile of disk device
54 groove
55 web
58 turbine runner
59 disk device
60 segment
61 structural component
62 ledge of disk device
63 groove of turbine blade
64 ledge of disk device
67 turbine runner
68 segment
69 disk device
71 to 74 flank
α angle
A axial direction
R radial direction
S main flow direction
U circumferential direction
ω rotational direction of the rotor disk

The invention claimed is:

1. A cooled turbine runner for a gas turbine, comprising:
a plurality of turbine blades that are radially arranged at a circumferential surface of a rotor disk including a disk finger groove,
at least one turbine blade of the plurality of turbine blades including a blade root that is profiled and inserted at the circumferential surface of the rotor disk into the disk finger groove that is correspondingly profiled, and
a cooling device including a cooling air supply channel positioned in the blade root which extends predominately axially and over a part of an axial length of the blade root, and which includes at least one inlet with an inlet opening positioned in the blade root at an inflow side of the blade root, wherein the at least one inlet includes a projection,
wherein a middle axis of the inlet, in a direction oriented towards the inlet opening and in an area of the inlet opening, has an extension component in a rotational direction of the rotor disk.

2. The turbine runner according to claim 1, wherein the projection is positioned on a disk device that is arranged in front of the blade root seen in the flow direction, and is held in abutment at the blade root.

3. The turbine runner according to claim 2, wherein the disk device is a covering plate that forms a full ring.

4. The turbine runner according to claim 2, wherein the disk device includes a plurality of segments in a circumferential direction, wherein at least one of the plurality of turbine blades is assigned to each of the plurality of segments, respectively.

5. The turbine runner according to claim 4, wherein the plurality of segments form a disk ring in a mounted state.

6. The turbine runner according to claim 2, wherein the at least one inlet includes a plurality of inlets assigned to the at least one turbine blade.

7. The turbine runner according to claim 1, and further comprising a cooling channel branching off the cooling air supply channel and extending inside the at least one turbine blade up to an outlet opening at a surface of the at least one turbine blade.

8. The turbine runner according to claim 4, wherein at least one of the plurality of segments includes a plurality of inlets of adjacent ones of the plurality of turbine blades.

9. The turbine runner according to claim 2, wherein the disk device is combined integrally with a sealing device, which in an assembled state, is arranged between a turbine guide vane of the gas turbine and the turbine runner that are adjacent in the axial direction.

10. The turbine runner according to claim 2, wherein facing sides of the disk device and of the at least one turbine blade are respectively configured in a planar manner.

11. The turbine runner according to claim 1, wherein the inlet is configured to be horizontally bent in an area of the projection, wherein the middle axis is at least approximately aligned with a cooling air inflow direction, and is oriented in the predominately axial extension of the cooling air supply channel after the bend.

12. The turbine runner according to claim 1, wherein the inlet in the area of the projection is configured as a NACA duct.

13. The turbine runner according to claim 1, wherein the inlet in an area of the projection is shaped as a diffuser to have a cross-sectional channel area that expands in a flow direction.

14. The turbine runner according to claim 2, wherein the disk device has a profile on a side facing away from the blade root between two inlets that are spaced apart from each other in a circumferential direction, the profile connecting adjacent edges of the two inlets.

15. The turbine runner according to claim 2, wherein the disk device includes a ledge that projects in a radial direction and by which the at least one turbine blade is secured at the rotor disk in an axial direction.

16. The turbine runner according to claim 14, wherein the profile of the disk device has a wave shape.

17. The turbine runner according to claim 1, wherein the projection extends axially beyond an inflow side of the disk finger groove in a direction against a main flow direction of the gas turbine.

18. The turbine runner according to claim 1, and further comprising two cooling channels branching off the cooling air supply channel and extending inside the at least one turbine blade up to an outlet opening at a surface of the at least one turbine blade, the two cooling channels being connected to one inlet.

* * * * *